(12) United States Patent
Rafferty

(10) Patent No.: US 6,948,177 B2
(45) Date of Patent: Sep. 20, 2005

(54) PORTABLE CD-PLAYER WITH BUILT-IN CD STORAGE MECHANISM

(76) Inventor: Caryn Paige Rafferty, 1051 Via Tornasol, Aptos, CA (US) 95003

( * ) Notice: Subject to any disclaimer, the term of this patent is extended or adjusted under 35 U.S.C. 154(b) by 202 days.

(21) Appl. No.: 10/619,658

(22) Filed: Jul. 14, 2003

(65) Prior Publication Data

US 2004/0013070 A1 Jan. 22, 2004

Related U.S. Application Data

(60) Provisional application No. 60/397,169, filed on Jul. 18, 2002.

(51) Int. Cl.[7] ............................. G11B 23/00; G11B 33/04
(52) U.S. Cl. ............................................... 720/600
(58) Field of Search ........................ 720/600, 647, 720/646, 655, 657; 206/38, 308.1, 311, 320, 576, 579; 369/75.11

(56) References Cited

U.S. PATENT DOCUMENTS

| 3,104,289 | A | * | 9/1963 | Segel .................... 369/69 |
| 6,522,613 | B1 | * | 2/2003 | Frankeny et al. ........... 720/655 |
| 6,574,188 | B1 | * | 6/2003 | Fliegel ....................... 720/707 |
| 2002/0105886 | A1 | * | 8/2002 | Ramonowski ............. 369/75.1 |
| 2004/0187143 | A1 | * | 9/2004 | Tolkachev et al. .......... 720/655 |

FOREIGN PATENT DOCUMENTS

WO    WO 94-01866 A1 * 1/1994

* cited by examiner

*Primary Examiner*—Julie Anne Watko
(74) *Attorney, Agent, or Firm*—Donald R. Boys; Central Coast Patent Agency, Inc.

(57) ABSTRACT

A portable CD player having a body and a first access interface providing access to a CD playing apparatus within the player body, and a second access interface to a storage compartment also within the player body. The storage compartment spatially supports a CD storage mechanism configured to store a plurality of CD discs for access and selection by a user.

3 Claims, 4 Drawing Sheets

PORTABLE CD-PLAYER WITH BUILT-IN CD STORAGE MECHANISM

CROSS-REFERENCE TO RELATED DOCUMENTS

The present invention claims priority to a U.S. provisional patent application Ser. No. 60/397,169 entitled "A Method and Apparatus for Carrying a Library of CDs With a CD Player" filed on Jul. 18, 2002, disclosure of which is included herein at least by reference. Two document disclosures (504833 & 507652) were also filed in this case and are incorporated herein by reference

FIELD OF THE INVENTION

The present invention is in the field of portable music players and like devices and pertains particularly to a portable CD player device having a built-in CD storage mechanism.

BACKGROUND OF THE INVENTION

Manufacturers and developers are continually active in the field of portable CD players and like devices. There are numerous designs and styles of portable CD systems that are commercially available under a wide variety of brand names. Typically a portable CD player of prior-art has a capacity to play only one music CD at a time and does not have a capacity for CD storage of extra CDs. Therefore a user must carry extra CDs along with the portable player, such CDs typically stored in a separate carrier of which there are many designs. The industry has largely overlooked certain user needs or desires particularly in the area of a physical storage and ready accessibility of CD media for use with portable players. In the case of a separate CD case or carrier, a user must take extra precaution to insure that the carrier or case is not misplaced, stolen, or otherwise unavailable when the user whishes to access it while using a portable CD player.

There have been some efforts in the art to address the problem of CD storage capacity related to a portable CD player. For example, U.S. Pat. No. 6,222,809 issued to Totsuka, referred to hereinafter as Totsuka, provides a transparent door that supports a slot enabling a user to store one extra CD while another CD is loaded in the CD playing compartment. While this device has a built in storage slot capable of storing one CD, it does not provide the type of storage capacity that would be considered adequate by many users. Most users typically switch music selections quite frequently when listening to a portable CD player. The desired number of selections may come from a plurality of different CDs. Therefore, a user still must rely on a separate storage facility to retrieve a next CD containing one or more selections for play. The art of Totsuka accomplishes little in this regard.

Another attempt to provide an easily accessible storage medium is taught by U.S. Pat. No. 6,375,057, which describes a separate CD carrying case, which is adapted to also carry a portable CD player such that the player controls are visible and accessible, the player can be operated, and extra CDs can be retrieved from a storage area supported on the case. However, the case is still inherently separate from and not an integral part of the player. Such a solution may present additional problems such as contribution to player overheating and subsequent early demise of player components. Furthermore a third-party case acts to obscure the player design and logo, and typically does not match players of differing design and input indicia arrays of the player. Changing batteries and other maintenance options would still require separation of the player from the CD storage case.

In light of the shortcomings of the prior-art described above, what is clearly needed is a portable CD player having a CD storage mechanism integrated therewith wherein at least several extra CDs may be stored and retrieved without effecting operation of the unit as a CD player.

SUMMARY OF THE INVENTION

In a preferred embodiment of the present invention a portable CD player having a body is provided, comprising a first access interface providing access to a CD playing apparatus within the player body, and a second access interface to a storage compartment also within the player body. The player is characterized in that the storage compartment spatially supports a CD storage mechanism configured to store a plurality of CD discs for access and selection by a user.

In a preferred embodiment of this player the second access interface is a hinged door openable by a user-activated button. Also in a preferred embodiment the second access interface is located on the opposite face of the player from the face supporting the first access interface. In one embodiment the CD storage mechanism is a collection of individual sheaths each one capable of retaining at least one CD, the collection joined together at one end and affixed at that end to a wall of the storage compartment. In an alternative embodiment the CD storage mechanism is a collection of individual sheaths each one capable of retaining at least one CD therein, the collection thereof joined together at one end and affixed at that end to the underside of the second access interface, wherein the second access interface is of the form of an openable door.

In another embodiment of the invention the storage mechanism is a foldable, elongated strip containing sequentially arranged CD sheaths each one capable of retaining at least one CD therein, the strip attached at one end to a wall of the storage compartment. In yet another embodiment the storage mechanism is a collection of individual sheaths each one capable of retaining at least one CD therein, the collection thereof joined together at one end and affixed on one side to the floor of the storage compartment and on the other side to the second access interface, wherein the interface is of the form of an openable door such that upon opening the interface, the mechanism expands and fans out to present the CDs for selection.

In another aspect of the present invention, in a portable CD player, a CD storage mechanism for storing a plurality of CDs for access and selection is provided, comprising a storage compartment having a compartment floor and peripheral walls, a compartment door arcuately mounted along one peripheral wall of the compartment so as to substantially cover the compartment when closed, at least one panel that can be recessed in the compartment and axially mounted at one end therein, and a plurality of CD retention hubs strategically affixed to the door, panel, and compartment floor each one capable of retaining at least one CD. The mechanism is characterized in that a user opens the door of the compartment thereby providing access to one or more CDs retained on a hub affixed on the underside of the door, on opposing sides of the panel, and on the compartment floor, the hubs loaded with CDs aligning to form a CD stack within the storage compartment when the door is closed.

In some embodiments the at least one panel is fixed to a hinge and mechanically swings out of the compartment upon opening the compartment door. In others the at least one panel is spring loaded to pop up upon opening the compartment door.

BRIEF DESCRIPTION OF THE DRAWINGS FIGURES

DESCRIPTION OF THE PREFERRED EMBODIMENTS

Figure 1:
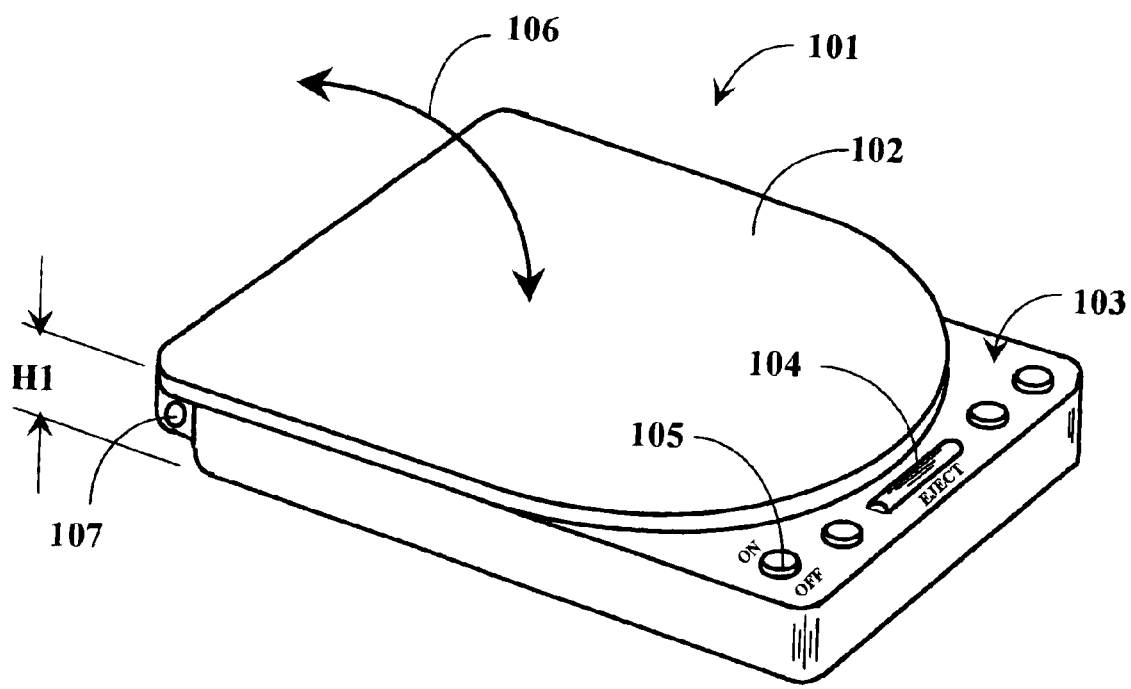
FIG. 1 is a perspective view of a CD player in the current art.

FIG. 1 is a perspective view of a CD player 101 as is known in the prior-art. CD player 101 has a door 102 hinged thereto by a hinge 107 for the purpose of enabling a user to open it generally in the direction of an arc illustrated herein as arc 106. Opening of door 102, of course, provides access to player mechanisms (not shown) within player 101. Door 102 can be manually or mechanically operated by depressing an eject button 104. CDs may be then inserted or removed therefrom as is generally known.

Player 101 has an instrument shelf 103 provided in the design and adapted to serve as an area-accessible shelf supporting eject button 104 and other controls (some illustrated but not labeled) as needed such as an illustrated on/off button 105. The conventional player 101 has a height in this example represented by dimension H1, which according to design preferences is typically of low profile.

Player 101, in one embodiment, may have a slot, not shown, provided in door 102 for storing a CD as in the teaching of Totsuka et al. However, as described briefly in the background section, a slot for storing one CD does not provide a viable or robust user option of music selection and in many cases may be bypassed for use if a desired selection involves a song or songs that are not contained by the CD currently stored in the slot.

Figure 2:
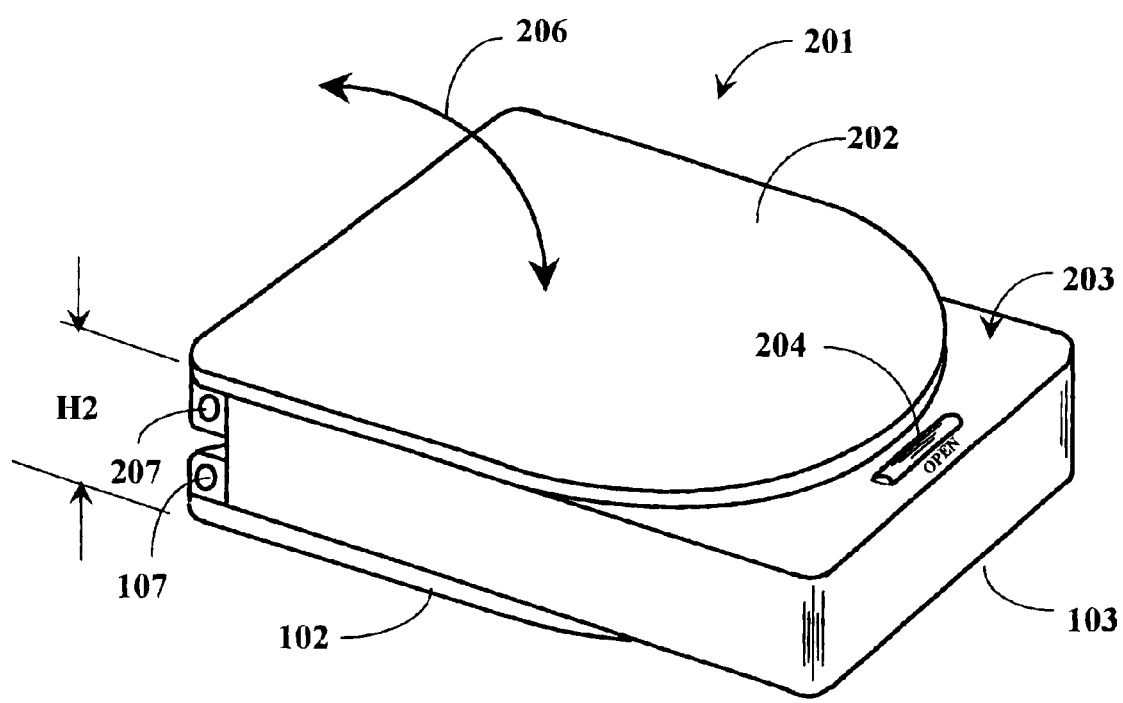
FIG. 2 is a perspective view of a CD player according to an embodiment of the present invention.

FIG. 2 is a perspective view of a CD player 201 according to an embodiment of the present invention. This example illustrates some components that are also illustrated in the prior-art example of FIG. 1 above. Those components that have been previously illustrated and retain the same functions in this embodiment shall retain the same element numbers, as the apparatus of the present invention does not cause them to be modified according to an embodiment of the present invention.

Similar to player 101, player 201 has a compartment door or door (102) attached thereto by hinge (107) enabling access to an inner drive platform (not illustrated) for playing CDs. Likewise, shelf(103) is present functioning as an area-accessible support for user indicia. Player 201 is similar to player 101 of FIG. 1 in many respects related to normal player function as just described. An enhancement provided to player 201 enables support of an integrated, robust CD storage facility.

It is a goal of the present invention to provide an integrated and robust CD storage facility to player 201 without significantly raising a height profile, illustrated herein as H2, from that of H1 referenced in description of the prior-art. To accomplish a more useable and robust CD storage facility, player 201 has a separate CD storage compartment accessible through a door 202 located substantially on the opposite side of the CD player compartment of player 201 from door 102. The storage compartment facilitates storage of a plurality of CDs for easy access and selection by a user. Door 202 can be manually or mechanically opened by depressing an open button, illustrated herein as button 204 provided strategically on a shelf 203, which is located substantially opposite of the face of shelf 103 of the prior-art example. Door 202 can be opened or closed in the general direction of an illustrated arc 206. In FIG. 2 the player is positioned so the storage compartment accessible through door 202 is facing upward and the player compartment faces downward. Hence, normal user controls for player operation are not visible in this view but may be assumed to be present.

In practice of the invention there is not a significant increase in height profile due to implementation of extremely low profile hinge components and relatively thin but durable material comprising door 202. Overall increase in height profile does not exceed approximately 250" from a standard profile of prior-art CD players, which may vary depending on brand. The inventor intends that FIG. 2 is representative of functional features and not necessarily design style considerations such as height profile representation.

Figure 3A:
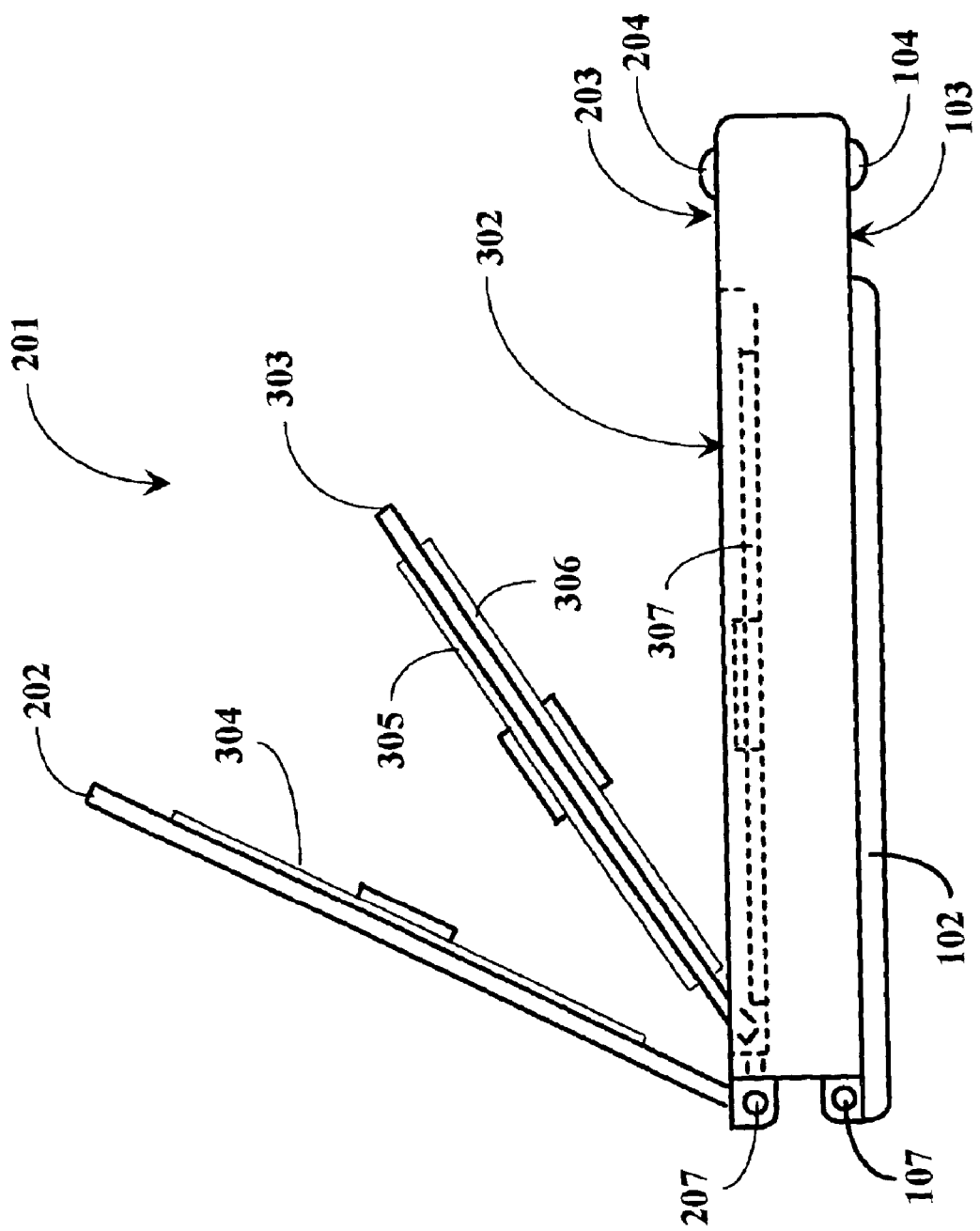
FIG. 3a is a side elevation view of the CD player of FIG. 2, showing one apparatus for storing CDs.

FIG. 3a is a side elevation view of CD player 201 of FIG. 2 illustrating a CD storage mechanism according to one embodiment of the present invention using a hub-mount method of securing the stored CDs. In this embodiment door 202 of player 201 is activated to open by depressing button 204 as previously described with reference to FIG. 2 above. The CD storage facility of the present invention utilizes no less than one hinged panel illustrated herein as a panel 303. There may be more than one such hinged panel. Panel 303 is hinged at its interface with player 201 and, in this embodiment, separately from hinge 207. However, in another embodiment, panel 303 and other like panels included could be adapted to share hinge 207.

Panel 303 has surface-mounted opposing hubs affixed thereto and adapted to retain at least one CD each, usually two each, the CDs illustrated herein as CD 305 and CD 306. Panel 303 may, in some embodiments be hinged mechanically so that when door 202 attains a certain degree of arc. Panel 303 automatically swings up and presents the CDs stored thereon. In another embodiment, panel 303 is spring loaded to swing out from player 201 when door 202 is opened. There are many possibilities.

Door 202 has in this embodiment, on its underside, a hub similar to the hubs provided on panel 303 adapted for the purpose of retaining at least one more CD illustrated herein as CD 304. To keep a low height profile, the hubs adapted to retain CDs are kept thin enough to retain one CD each. However, in other embodiments where height profile may be sacrificed to some extent, more than one CD may be retained on a single hub.

A cavity 302 is provided in the body of CD player 201. Cavity 302 is of a sufficient depth to accommodate panel 303 loaded with CDs in a closed position. As such, cavity 303 is devoid of any other obstructing components. The floor of cavity 302 has a hub provided thereon similar to the hubs of panel 303 and the hub of door 202, all of which are adapted to retain at least one CD. The hub provided on the floor of cavity 302 has a CD, illustrated herein as a CD 307 mounted thereon. In a minimum capacity storage embodiment there are therefore four CDs (CDs 304, 305, 306, and 307)

hub-mounted and accessible by opening door 202 and disengaging them from their respective hubs. The CD retaining method provided on each CD hub can be of a similar design to that of DVD packages or other suitable designs.

In one embodiment of the present invention panel 303 is eliminated entirely and the hubs of floor 302 and of the underside of door 304 are adapted to hold more CDs to accommodate for the CDs normally retained on panel 303. There are many possibilities. In yet another embodiment of the present invention an alternative CD storage mechanism is provided utilizing fewer components as is illustrated below.

Figure 3B:
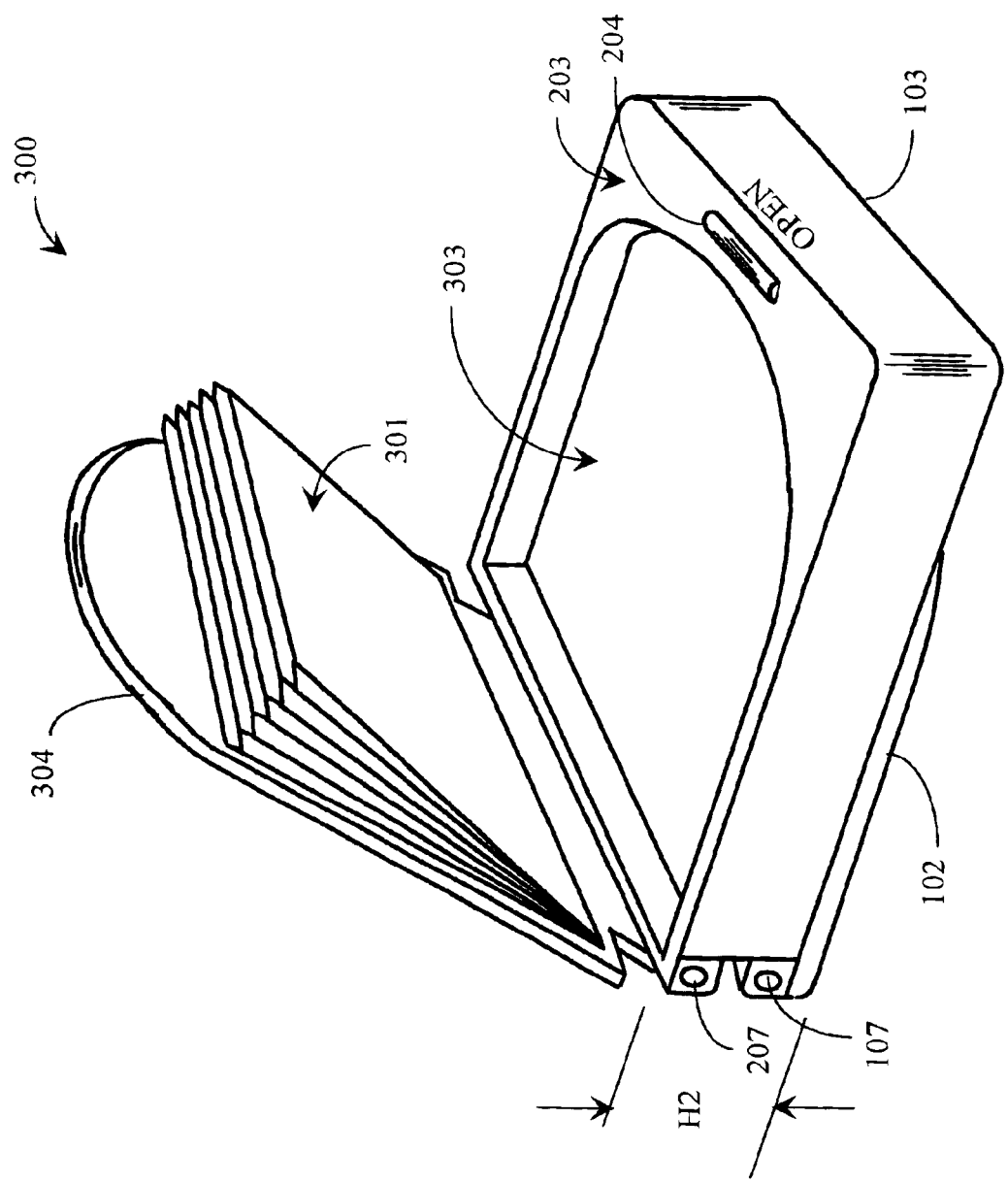
FIG. 3b is a perspective view of the CD player of FIG. 2, showing an alternative way of storing CDs.

FIG. 3b is a perspective view of a CD player 300 according to yet another embodiment of the present invention. Player 300 shares many of the same components illustrated with respect to the example of FIG. 1. Therefore, those common components shall not be re-introduced and shall retain the original element numbers assigned. Player 300 has a door 304 attached thereto by hinge 207. Door 304 is different than door 202 described with reference to FIG. 2 above in that it does not support a CD-retaining hub adapted to retain one or more CDs. Rather, door 304 supports a collapsible sheathing structure 301 that is adapted to retain at least 5 CDs in this embodiment. Structure 301 can be manufactured of a polymer or other suitable material and may also be made transparent so that a user may visualize which CDs are sheathed by structure 301.

Cavity 303, like cavity 302 described with reference to FIG. 3A above is of a sufficient depth to accommodate a plurality of CDs sheathed within structure 301such that when door 302 is closed, structure 301 is contained (in folded or collapsed position) within cavity 303. Structure 301 is just one of several structures that might be used within the spirit and scope of the invention. Alternatively, for example, there may be a spindle attached either to the door or in the compartment, or both, and spare discs may be stored on the spindle or spindles as described in the previous example of FIG. 3a. There may also be removable structures for storing discs. In this example, structure 301 has enough storage leaflets or sheaths for storing at least 5 CDs, which are all retained in a stacked array within cavity 303.

The exact location of structure 301 with reference to door 302 can vary significantly without departing from the spirit and scope of the present invention. For example, in one embodiment structure 301 can be attached to the floor or back side-wall of cavity 303 and to either, or both sides of the underside of door 302 so that the structure opens like a fan when door 302 opens. In this embodiment, a user simply depresses button 204 to activate door 302 for the purpose of CD exchange. The CDs are presented to the user according to the structure design of the mechanism. In this case, structure 301 comprises a plurality of individual sheaths converging at some hinge, rivet set, or other fastening arrangement at the rear of door 302. Alternatively, structure 301 may be hinged, riveted, or otherwise fastened to the floor of cavity 303 or to the back wall of cavity 303. Each sheath has a capacity to retain at least one CD. At minimum storage capacity, a minimum of 5 CDs can be stored in this embodiment.

In still another embodiment, storage structure 301 comprises a large foldable polymer strip that can be manually unfolded from an attached position on the underside of door 302 or from the floor or from a wall of cavity 303 revealing sequentially arranged CD storage sheaths similar to a foldable credit card holding strip. In this embodiment, the only limit to the number of CDs stored is the depth of cavity 303. There are a variety of possible ways that storage structure 301 may be implemented within CD player 300 without departing from the spirit and scope of the present invention.

It will be apparent to the skilled artisan as well that there are many alterations that may be made to the embodiments described above without departing from the spirit and scope of the invention. There are, for example, a number of ways the doors may open, close and latch. There are a variety of materials that may be used, and so on. Therefore, the method and apparatus of the present invention should be afforded the broadest possible scope under examination. The spirit and scope of the present invention should be limited only by the claims that follow.

What is claimed is:

1. In a portable CD player, a CD storage mechanism for storing a plurality of CDs for access and selection comprising:

a storage compartment having a compartment floor and peripheral walls;

a compartment door swingedly mounted along one peripheral wall of the compartment so as to substantially cover the compartment when closed;

at least one panel recessable in the compartment and axially mounted at one end therein; and a plurality of CD retention hubs affixed to the door, panel, and compartment floor each one capable of retaining at least one CD;

characterized in that a user opens the door of the compartment thereby providing access to one or more CDs retained on a hub affixed on the underside of the door, on opposing sides of the panel, and on the compartment floor, the hubs loaded with CDs aligning to form a CD stack within the storage compartment when the door is closed.

2. The CD storage mechanism of claim 1 wherein the at least one panel is fixed to hinge and mechanically swings out of the compartment upon opening the compartment door.

3. The CD storage mechanism of claim 1 wherein the at least one panel is spring loaded to pop up upon opening the compartment door.

* * * * *